United States Patent [19]

Lavender

[11] 4,109,680
[45] Aug. 29, 1978

[54] PLATE TYPE FLUID DISTRIBUTING DEVICE

[76] Inventor: Ardis R. Lavender, 6 Starlight Dr., Clarks Summit, Pa. 18411

[21] Appl. No.: 756,094

[22] Filed: Jan. 3, 1977

[51] Int. Cl.² .............................................. F16L 55/02
[52] U.S. Cl. ...................................... 137/599; 138/42; 251/127
[58] Field of Search .......................... 251/127; 138/42; 137/561 R, 561 A, 833, 599, 594

[56] References Cited

U.S. PATENT DOCUMENTS

| 2,132,854 | 10/1938 | Knott | 138/42 |
| 3,295,552 | 1/1967 | Powell et al. | 137/604 |
| 3,382,534 | 5/1968 | Veazcy | 137/604 X |
| 3,545,492 | 12/1970 | Scheid, Jr. | 138/42 |
| 3,680,576 | 8/1972 | Kiwak | 137/833 X |
| 3,725,186 | 4/1973 | Lynch | 138/42 |
| 3,811,474 | 5/1974 | Baver et al. | 137/833 |

Primary Examiner—William R. Cline
Attorney, Agent, or Firm—Vogel, Dithmar, Stotland, Stratman & Levy

[57] ABSTRACT

A device for distributing fluid from an inlet to an outlet, in which a series of plates in stack configuration provides a continuously subdividing fluid flow path between the inlet and the outlet such that the fluid distribution at the outlet is over a substantially greater area than the fluid at the inlet. Each plate in the stack of plates is provided with a plurality of apertures which in stack configuration define a plurality of fluid flow paths symmetrically about the axis of the fluid inlet.

13 Claims, 18 Drawing Figures

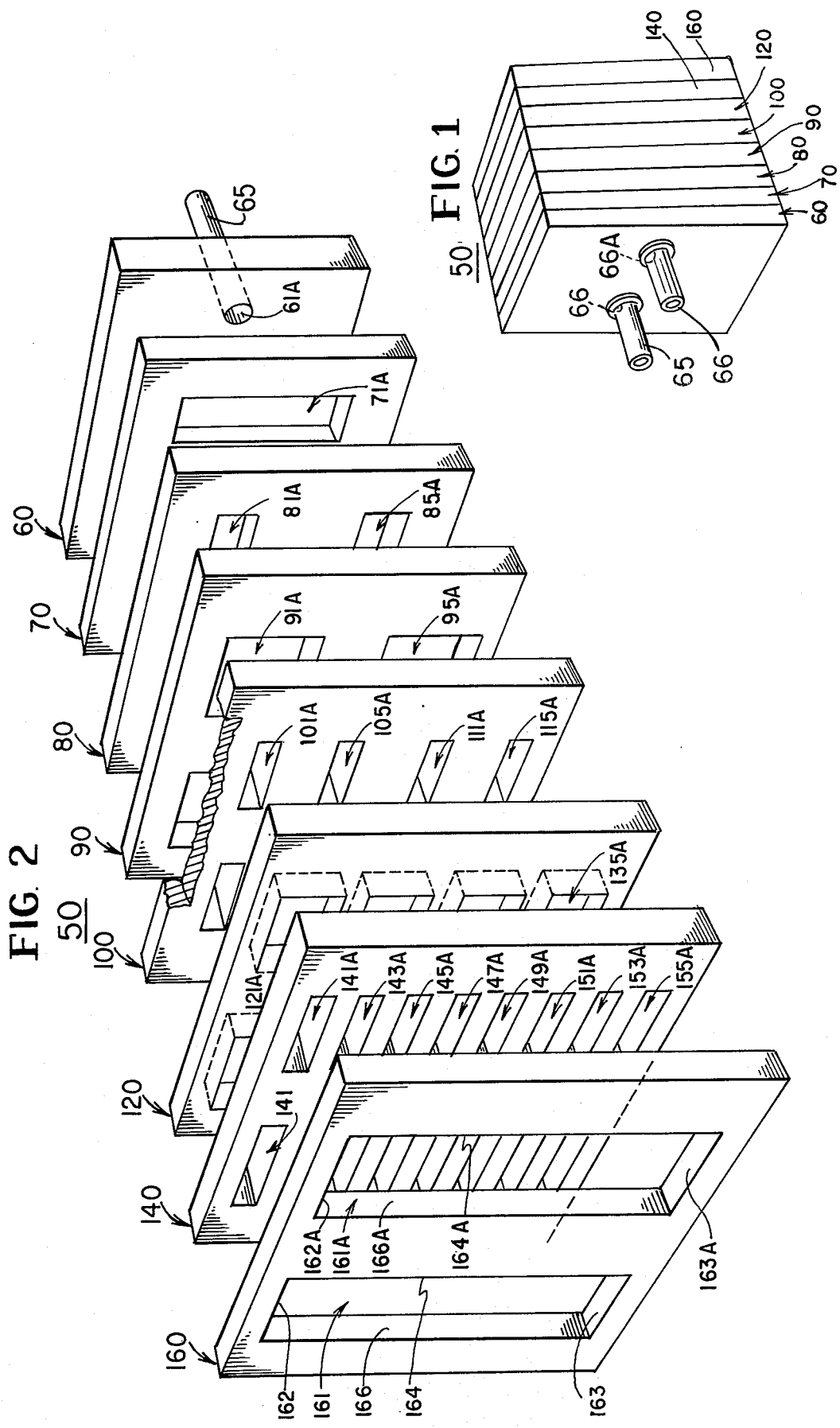

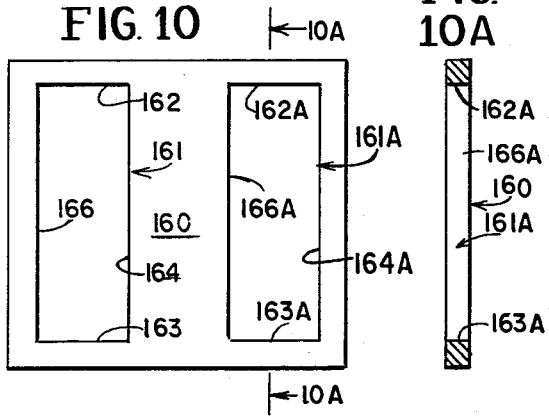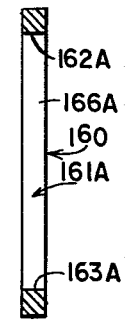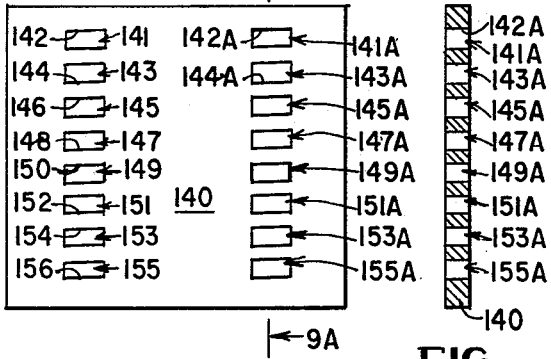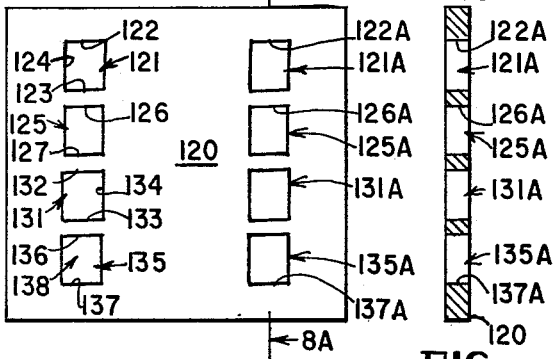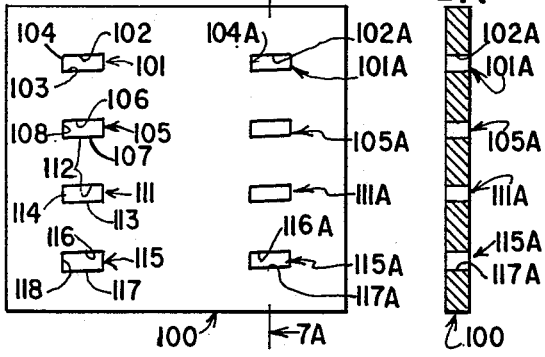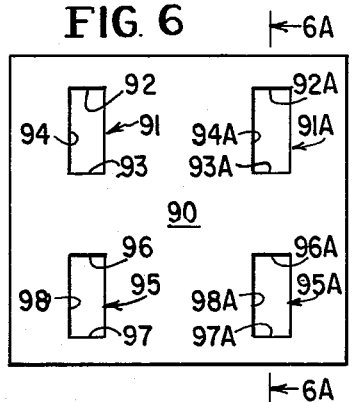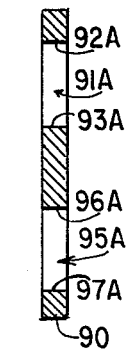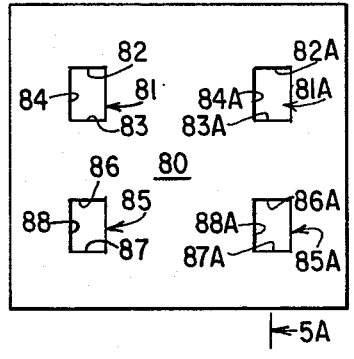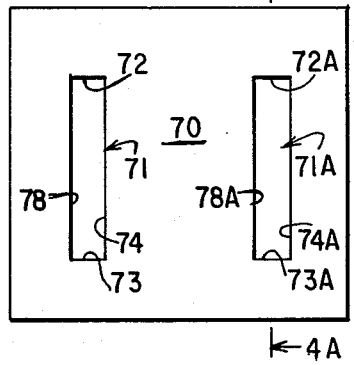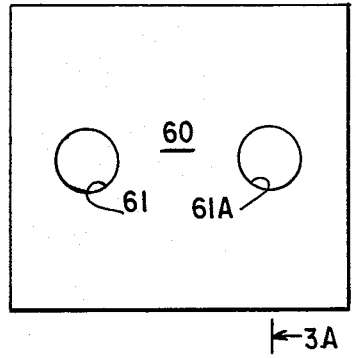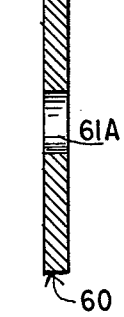

PLATE TYPE FLUID DISTRIBUTING DEVICE

BACKGROUND OF THE INVENTION

Distributing devices are useful in mass transfer to distribute fluid evenly over a large area fluid flow path. In cases of mass transfer through a membrane, the fluid should be evenly distributed over all areas of the membrane in order to achieve the optimum mass transfer. In some devices, such as parallel flow hemodialyzers in which there are many parallel membranes, even distribution must be not only across each membrane, but also to each membrane. Other uses of distributing devices of the type hereinafter set forth, include any mass transfer operation in which fluid from a single source must be distributed evenly over a large area.

Distributors of the type hereinafter set forth are often difficult to fabricate and it is this problem to which the present invention is directed, since production of the present distributor is readily adapted to high speed stamping, indexing and sealing operations.

SUMMARY OF THE INVENTION

This invention relates to a device for distributing fluid and more particularly to a device comprised of a series of plates in stack configuration.

An important object of the present invention is to provide a device for distributing fluid uniformly to a large area in which a series of plates arranged in stack configuration define the distributing fluid flow paths.

Another object of the present invention is to provide a device for distributing fluid from an inlet comprising a series of plates in stack configuration, one outermost plate in the stack of plates having an aperture therein defining the inlet, the other outermost plate in the stack of plates having an aperture therein defining the outlet, each intermediate plate having an aperture therein in fluid communication with apertures in abutting plates in the stack such that fluid flow subdivides into a plurality of fluid flow paths between the inlet and the outlet, whereby fluid entering the inlet subdivides into a plurality of fluid flow paths to distribute fluid at the outlet evenly.

These and other objects of the present invention may be understood more readily by reference to the following specification taken in conjunction with the drawings wherein:

BRIEF DESCRIPTION OF THE DRAWINGS

FIG. 1 is a perspective view of the distributor device of the present invention in assembled configuration;

FIG. 2 is an exploded perspective view of the device illustrated in FIG. 1; and

FIGS. 3 through 10 and 3A through 10A, respectively being plan and sectional views of each plate comprising the device illustrated in FIG. 1.

DESCRIPTION OF THE PREFERRED EMBODIMENT

Referring now to the drawings, there is disclosed a distributor 50 comprised of individual plates 60, 70, 80, 90, 100, 120, 140 and 160 arranged in stack configuration. The plate 60, being the first or inlet plate in the stack of plates is provided with an aperture 61 therein. The aperture 61 is circular to accommodate a tublature 65 sealingly secured to the plate 60 by a mounting flange 66. A second aperture 61A is spaced from the first aperture 61 and is constructed and arranged to accommodate a like tublature 65A and sealing flange 66A. For illustrative purposes only, the distributor 50 is shown with two separate flow paths as indicated by the parallel inlet tublatures 65 and 65A. It should be specifically understood, that the distributor 50 may be constructed to accommodate a plurality of fluid paths, or for that matter to accommodate only one.

In describing the distributor 50, only one set of apertures will be set forth, it being understood that parallel identical apertures, such as 61 and 61A are provided in each plate, thereby to establish separate but parallel fluid flow paths from the respective inlets 65 and 65A through the distributor 50 to an outlet hereinafter set forth. Adjacent the plate 60, there is provided a plate 70, of the same peripheral dimensions as the plate 60 and in sealing relationship to the plate 60 in the stack. The plate 70 has provided therein an elongated rectangular aperture 71 having an upper edge 72, a lower edge 73 and spaced apart side edges 74. In the stack, the mid point of the aperture 61 substantially co-incides with the mid point of the aperture 71. The diameter of the aperture 61 is larger than the width of the aperture 71; however, in the stack the aperture 61 is in fluid communication with the aperture 71 and the fluid flow path defined by the upper and lower edges 72 and 73 respectively and the side edges 74 of the aperture 71. Since plates 60 and 70 are sealed together in the stack, fluid flowing through aperture 61 will entirely fill aperture 71 as the fluid flows through plate 70.

In the stack of distributor 50, a plate 80 abuts and is in sealing relation with the plate 70. The plate 80 has the same peripheral dimensions as the plate 70 and is provided with spaced apart apertures 81 and 85 therein. The aperture 81 is rectangular having upper edge 82, a lower edge 83 and side edges 84, the upper edge 82 being in registry with the upper edge 72 of the aperture 71 when the plates 70 and 80 are in abutting and sealing relationship and the side edges 74 and 84 being aligned. The aperture 85 is positioned below the aperture 81 and spaced therefrom and is defined by an upper edge 86, a lower edge 87 and spaced apart side edges 88, the lower edge 87 being in alignment with the lower edge 73 and the side edges 88 being aligned with the edges 74 when the plates 70 and 80 assembled in the stack. Accordingly, fluid entering the distributor 50 through the aperture 61 flows into the aperture 71 and hence into apertures 81 and 85, the apertures 81 and 85 dividing the fluid flow stream from the initial centrally located unitary stream into two spaced apart streams.

Referring now to FIG. 6, there is disclosed a plate 90 having the same peripheral dimensions as the previously described plates 60, 70 and 80. The plate 90 is provided with two elongated apertures 91 and 95, with the aperture 91 having an upper edge 92, a lower edge 93 and spaced apart side edges 94; the aperture 95 having an upper edge 96, a lower edge 97 and spaced side edges 98. It should be noted that, the upper edge 92 of the aperture 91 is closer to the adjacent peripheral plate edge than is the upper edge 82 of the aperture 81. Since the aperture 91 has a greater longitudinal extent although the same transverse dimension as the aperture 81, the end edges 92 and 93 extend respectively beyond the end edges 82 and 83 of the aperture 81, thereby providing a larger area for fluid distribution that available in the aperture 81. Likewise, the aperture 95 has a greater longitudinal extent although the same transverse dimension as the aperture 85, thereby providing the same expanded fluid flow area with respect to the aperture 85 as hereinbefore discussed. Fluid flowing through plate 80 into plate 90 will expand to, but remain in the boundaries of the apertures 91 and 95.

FIG. 7 illustrates a plate 100 having the same peripheral dimensions as the previously described plates 60, 70, 80 and 90. Plate 100 is provided with four apertures 101, 105, 111 and 115, each having the same transverse dimensions as the previously described apertures 71, 81, 85, 91 and 95. Specifically, the aperture 101 is provided with an upper edge 102, a lower edge 103 and spaced apart side edges 104, the upper edge 102 being in registry with the upper edge 92 of the aperture 91. The aperture 105 is defined by an upper edge 106, a lower edge 107 and spaced apart side edges 108, with the lower edge 107 being in registry with the lower edge 93 of the aperture 91 when the plates 100 and 90 are in the stack. Aperture 111 is defined by upper edge 112, a lower edge 113 and spaced apart side edges 114, with the upper edge 112 being in registry with the upper edge 96 of the aperture 95. Similarly, the aperture 115 is defined by the upper edge 116, a lower edge 117 and spaced apart side edges 118 with the lower edge 117 being in registry with the lower edge 97 of the aperture 95. When plates 100 and 90 are in stack configuration, fluid flowing through the aperture 91, will be distributed into apertures 101 and 105, since edges 102 and 107 respectively are in registry with edges 92 and 93 of aperture 91 and edges 104 and 108 are in registry with edges 94. Fluid flowing through aperture 95 will be distributed into apertures 111 and 115, since the edges 112 and 117 respectively are in registry with edges 96 and 97 of the aperture 95 and edges 114 and 118 are in registry with edges 98. Accordingly, fluid flowing from plate 90 through plate 100, is subdivided from two paths defined by apertures 91 and 95 into four paths defined by apertures 101, 105, 111 and 115.

Referring now to FIG. 8, there is disclosed a plate 120 having the same peripheral dimensions as the previously described plates 60 through 100. The plate 120 has four apertures 121, 125, 131 and 135, arranged in column with each aperture being respectively in registry with a corresponding aperture in plate 100. The aperture 121 is defined by an upper edge 122, a lower edge 123 and spaced apart side edges 124. The edges 122 and 123 of the aperture 121 extend beyond the respective edges 102 and 103 of the aperture 101, while the side edges 124 and 104 are aligned. Similarly, the apertures 125 defined by the upper edge 126, the upper edge 127 and side edges 128 is in registry with the aperture 105, but the edges 126 and 127 are spaced from the respective adjacent edges 106 and 107. The sie edges 128 and 108 are aligned. Similarly, the aperture 131 defined by the upper edge 132, the lower edge 133 and side edges 134, is in registry with the aperture 111, but extend therebeyond as described. The aperture 135 defined by the upper edge 136, the lower edge 137 and side edges 138, is in registry with the aperture 115 as hereinbefore described. Since the plates 120 and 100 are in sealingly relation one to the other and abut in the stack, fluid flowing through the plate 100 and particularly through the aperture 101 therein, enters the aperture 121 and expands to fill the dimensions thereof. Similarly, fluid flowing through the aperture 105 expands to fill the dimensions of the aperture 125 and fluid flowing from the aperture 111 expands to fill the dimensions of the aperture 131. Finally, fluid flowing through the aperture 115 and into the aperture 135 expands to fill the dimensions of that aperture as defined by edges 136, 137 and 138. While, the number of apertures in the plate 120 and the plate 100 are the same, the dimensions of the apertures in the plate 120 are greater than the dimensions of the apertures in the plate 100, such that fluid leaving the plate 120 in four distinct fluid flow paths occupies much greater cross sectional areas in the plane normal to the flow path than the fluid leaving the plate 100. In other words, each of the four flow paths defined by the apertures in the plate 120 have a greatly expanded area in the plane normal to the flow paths or in the plane of the plate when compared to the flow paths defined by the plate 100.

Referring now to FIG. 9 and plate 140 disclosed therein, it is seen that the plate has the same peripheral dimensions as the previously described plates and is provided with eight apertures arranged in a column. Of the eight apertures, the topmost aperture 141 has an edge 142 which in stack configuration is in alignment with the edge 122 of the aperture 121. Directly below the aperture 141 is an aperture 143 having a lower edge 144 in direct alignment with the lower edge 123 of the aperture 121 when plates 120 and 140 are in a stack. The aperture 145 has an upper edge 146 and the aperture 147 directly below the aperture 145, has a lower edge 148, the edge 146 being in alignment with the edge 126 of the aperture 125 and the edge 148 being in alignment with the edge 127 of the aperture 125 when the plates are in a stack. Similarly, the aperture 149 having an upper edge 150 and the aperture 151 having a lower edge 152 are in alignment with the upper edge 132 and the lower edge 133 respectively of the aperture 131 and the apertures 153 and 155 with an upper edge 154 and a lower edge 156 respectively are in alignment with the aperture 135 and specifically the upper edge and the lower edge 136 and 137 thereof. The side edges of each aperture 141 through 155 in the plate 140 are in alignment with the respective side edges of each aperture 71, 81, 85, 91, 95, 101, 105, 111, 115, 121, 125, 131 and 135 described herein.

Fluid flowing through plate 120 and particularly aperture 121, subdivides into two fluid flow paths half being directed through the aperture 141 and the other half being directed through the aperture 143. Since the plates 140 and 120 are sealed one to the other and since the edge 142 is in registry with the edge 122, the edge 144 is in registry with the edge 123, and the side edges of the apertures are aligned, all the fluid flowing through the aperture 121 divides into two equal flow paths through apertures 141 and 143. For fluid flowing through the aperture 125, there is an equal subdivision thereof through the apertures 145 and 147. The reason is the same as previously described. Fluid flowing through the aperture 131 subdivides into two equal fluid flow paths through the apertures 149 and 151. Finally, fluid flowing through the aperture 135 subdivides into two equal paths through the apertures 153 and 155. As seen, four fluid flow paths defined by the plate 120 become eight fluid flow paths defined by the plate 140, with each fluid flow path having an identical amount of fluid flowing therethrough, since each fluid particle sees the exact same or is subjected to the same fluid flow resistance between the plates 60 and 140.

Fluid exiting through the apertures described in the plate 140, enter the plate 160 and the enlarged rectangular aperture 161 therein. The aperture 161 is defined by an upper edge 162, a lower edge 163 and side edges 164 and 166. The aperture 161 has peripheral dimensions larger than the column of apertures in plate 140, whereby fluid flowing through the apertures in plate 140 expands and merges into a single plenum defined by the aperture 161. Accordinly, fluid entering the distributor 50 through an inlet tublature 65 having a relatively small cross sectional area in a plane normal to the direction of fluid flow, exits the distributor 50 through the aperture 161 having a substantially larger area in a plane normal to the direction of fluid flow. Further and of critical importance, fluid exiting or leaving the distributor 50 through the aperture 161 is uniformly distributed over the entire surface area of the aperture, thereby fulfilling the principle object of the present invention.

The distributor 50 has many uses in industry, and one such use is to distribute blood flowing from a vessel of a patient undergoing dialysis to a short path parallel flow hemodialyzer. In short path parallel flow dialyzers, many plates are stacked and separated by semipermeable membranes. One problem with parallel flow dialyzers is to distribute blood evenly between each of the plates and the adjacent membranes. Similarly, dialysate must be evenly distributed also. A distributor 50 of the type hereinabove described, accomplishes even blood distribution over the entire surface of the stack, thereby greatly increasing the efficiency of dialysis.

In a constructional example, a distributor 50 is made from a biocompatible plastic, such as a polycarbonate. The plate 60 is a polycarbonate having a thickness of 0.03 inches. The plate 60 has a transverse dimension of 2.25 inches and a vertical dimension of 1.93 inches, it being understood that as previously set forth that transverse and vertical are for reference merely to the specification and drawings, but in practical use, it is clear that the device may be rotated in any axis. The center of the aperture 161 is 0.5 inches from the adjacent side edge of the plate 60 and the center of the aperture 161A is also 0.5 inches from the adjacent side edge. Since the aperture 61 and 61A are centrally located, their centers are 0.965 inches from both the upper edge and the lower edge of the plate 60. The plate 70 is also made of the same polycarbonate material and has a thickness of 0.03 inches; its peripheral dimensions of 2.25 inches and 1.93 inches are the same as are the all other plates hereinafter described. The aperture 71 and hence also the aperture 71A is 1.09 inches in longitudinal extent and 0.25 inches in transverse dimension. The side edge of the aperture 71 is 0.375 inches from the adjacent side edge of the plate 70 and both the top edge 72 and the bottom edge 73 are 0.42 inches from the adjacent plate edge. Similar dimensions pertain to the aperture 71A.

Plate 80 is made of a polycarbonate material 0.015 inches thick and has the same peripheral dimensions as the plates 60 and 70. The apertures 81 and 82, are identical in size, each being 0.25 inches square. Each of the apertures is positioned 0.42 inches from the adjacent top or bottom edge plate and the nearest side edge is 0.375 inches from the adjacent side edges of the plate 80. Accordingly, it is seen in the comparison of the apertures 71, 81 and 85, that top edges 72 and 82 are respectively located 0.42 inches from the adjacent top edge of the plates 70 and 80 and the bottom edges 87 and 73 are located 0.42 inches from the adjacent bottom edge of the plates 80 and 70. Similarly, all of the apertures 71, 81 and 85 have a transverse dimension of 0.25 inches, each being located 0.375 inches inward from the adjacent side edge of the respective plate. Therefore, fluid flowing through the aperture 71 is forced, because of the sealing relationship between the plates 70 and 80, into the apertures 81 and 85 and no fluid escapes transversely of the flow path or in a direction parallel to the face of the plates 70 and 80.

The apertures 91 and 95 in the plate 90, are each 0.25 inches wide or transverse dimension and 0.54 inches in longitudinal dimension. The upper edge 92 of the aperture 91 is 0.273 inches from the adjacent edge of the plate and a lower edge 297 is 0.273 inches from the adjacent edge of the plate 90, with the plate 90 being 0.015 inches thick and made of the same polycarbonate material as the previous plates. Plate 100 is provided with four apertures 101, 105, 111 and 115, each having the same dimensions and being arranged in column configuration. Each of the apertures is 0.125 inches in vertical or longitudinal dimension and the same 0.25 inches transverse dimension or width. The distance from edge of the apertures to the edge of the plate is the same as all previous apertures described, thereby restricting the fluid flow from the apertures 91 and 95 through the apertures 101, 105, 111 and 115 provided in the plate 100. Since the upper edge 102 is 0.273 inches from the adjacent edge of the plate as is the upper edge 92 of the aperture 91 and similarly, the lower edge 117 is 0.273 inches from the adjacent edge of the plate as is the lower edge 97, all fluid flowing through the apertures 91 and 95 flow into and through the apertures in the plate 100 and all of the fluid will be evenly distributed between the four apertures which define the four new flow paths.

Referring now to FIG. 8, and plate 120, the apertures 121, 125, 131 and 135 provided therein in column configuration each has a transverse dimension of 0.25 inches and a longitudinal or vertical dimension of 0.27 inches. Since each aperture in the plate 100 is respectively aligned with an aperture in a plate 120, fluid flowng through an aperture in the plate 100, expands to fill the enlarged aperture in the plate 120, but since no fluid is transferred between the four distinct flow paths, the integrity of the system is maintained.

Referring now to FIG. 9 and plate 140, the eight apertures therein have precisely the same dimensions with each aperture being 0.062 inches in vertical dimension and 0.25 inches in horizontal or transverse dimensions. The distance between the upper edge 142 of the aperture 141 and the lower edge 144 of the aperture 143 is 0.272 inches or precisely the same as the longitudinal or vertical extent of the aperture 121 in the plate 120. Since the edge 142 of the aperture 141 is in alignment with the edge 122 of the aperture 121 and the edge 144 of aperture 143 is in alignment with the edge 123 of aperture 121, fluid flowing through the aperture 121 in the plate 120, is divided evenly between apertures 141 and 143 and equal amounts of fluid flow through these two apertures. Similarly, the apertures 145 and 147 are designed to coincide with the aperture 125 in the same manner as previously described, whereby fluid flowing through the aperture 125 is evenly divided between the apertures 145 and 147. The same is true for the apertures 149 and 151 with respect to the aperture 131 and the apertures 153 and 155 with respect to the aperture 135. The column of apertures in the plate 140 is precisely located in the plate to correspond with the column formed by the apertures in the plate 120, such that all fluid flowing through the plate 120 in four fluid flow paths is evenly divided into eight fluid flow paths exiting the plate 140.

As illustrated, the aperture 161 in the plate 160 representing the final fluid plenum is in a plate having the same thickness of 0.015 inches as other of the plates, however, the aperture 161 has a greater transverse dimension that the apertures hereinbefore described. Aperture 161 is 0.50 inches in the transverse direction and is 0.125 inches away from the upper and lower edges of the plate 160. Accordingly, it is seen that the opening or aperture 161 is twice as wide and substantially greater in longitudinal dimension as the columns of apertures hereinbefore set forth in plates 70 through 140. The net result is that as fluid exits the apertures in plate 140, it expands uniformly to fill the aperture 161 and thereby accomplish the objects of the present invention.

While there has been described what is considered to be a preferred embodiment of the present invention, it will be understood that polycarbonate is but one material in a whole range of synthetic organic resins which is pertinent to the pesent invention. Furthermore, any metal capable of being die stamped, is also applicable to the present invention. If the purpose is heat transfer, then a metal of high heat conductivity would be useful. On the other hand, heat transmittal through the distributor 50 may be undesirable and therefore, a material which is a good heat insulator would be utilized. In any event, the principle feature of the present invention heretofore described, is that fluid is uniformly distributed and it lends itself to rapid production. Each of the plates 60 through 160 may be rapidly die stamped, thereafter assembled in stack relationship and sealed to provide the required fluid tight relationship between the adjacent plates. Registry of plates all having the same dimension is often done in industry and die stamping is one of the most rapid production methods known. Accordingly, it is seen that a fluid distributor has been provided which is rapidly adaptable to mass production.

While there has been described what at present is considered to be a preferred embodiment of the present invention, it will be understood that various alterations and modifications may be made therein without departing from the true spirit and scope of the present invention and it is intended in the appended claims all such alterations and modifications.

What is claimed is:

1. A device for distributing fluid comprising a series of plates in stack configuration, one outermost plate in said stack of plates having an aperture therein defining an inlet, the other outermost plate in said stack of plates having an aperture therein defining an outlet, each intermediate plate having an aperture therein in fluid communication with apertures in abutting plates in said stack such that the fluid flow subdivides into a plurality of fluid flow paths between said inlet and outlet, a first set of alternate plates in said stack wherein each plate in the set has the same number of apertures as the preceding plate in the stack with the total area of the apertures being substantially increased compared to the total area of the apertures in the preceding plate in the stack, a second set of alternate plates in said stack wherein each plate in the set has twice the number of apertures as the preceding plate in the stack, whereby fluid from said inlet subdivides into a plurality of fluid flow paths to distribute fluid at said outlet evenly.

2. The device set forth in claim 1, wherein there are an even number of plates between said inlet plate and said outlet plate.

3. The device set forth in claim 1, wherein said outlet plate has a single aperture therein defining a plenum.

4. The device set forth in claim 1, wherein said fluid flow through said inlet defines an axis and the fluid flow paths defined by said stack forms a mirror image about said axis.

5. The device set forth in claim 1, wherein the number of apertures in every other plate is twice the number as in the preceding other plate.

6. The device set forth in claim 1, and further including means for sealing said plates together in said stack.

7. The device set forth in claim 1, wherein said plates are synthetic organic resin.

8. The device set forth in claim 1, wherein said plates are metal.

9. The device set forth in claim 1, wherein said inlet aperture is circular and said outlet aperture is rectangular.

10. The device set forth in claim 1, wherein the total area of the apertures in each of the second set of plates is less than the total area of the apertures in the preceding plate.

11. The device set forth in claim 1, wherein the apertures in said second set are rectangular and arranged in columns with the sides thereof in registry.

12. The device set forth in claim 11, wherein the sides of the apertures in the first set of plates are in registry respectively with the sides of the apertures in the second set of plates.

13. The device set forth in claim 12, wherein the apertures in each of the second set of plates are positioned at the upper and lower edges of the apertures in the preceding plate.

* * * * *